(12) United States Patent
Dinh (10) Patent No.: US 7,327,128 B2
(45) Date of Patent: Feb. 5, 2008

(54) SWITCHING POWER SUPPLY TRANSIENT SUPPRESSION

(75) Inventor: James S. Dinh, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/027,464

(22) Filed: Dec. 29, 2004

(65) Prior Publication Data

US 2006/0139015 A1 Jun. 29, 2006

(51) Int. Cl.
G05F 1/595 (2006.01)
G05F 1/618 (2006.01)

(52) U.S. Cl. ...................... 323/272; 323/285
(58) Field of Classification Search ................ 323/268, 323/271, 272, 282, 283–285; 361/90, 92
See application file for complete search history.

(56) References Cited

U.S. PATENT DOCUMENTS

| | | | |
|---|---|---|---|
| 6,232,754 B1 * | 5/2001 | Liebler et al. .............. 323/272 |
| 6,246,222 B1 | 6/2001 | Nilles et al. |
| 6,563,294 B2 | 5/2003 | Duffy et al. |
| 6,670,794 B1 | 12/2003 | Wang et al. |
| 6,696,882 B1 | 2/2004 | Markowski et al. |
| 6,879,137 B2 * | 4/2005 | Sase et al. .................. 323/282 |
| 6,975,494 B2 * | 12/2005 | Tang et al. .................... 361/64 |
| 7,007,176 B2 * | 2/2006 | Goodfellow et al. ........ 713/300 |
| 2004/0076026 A1 | 4/2004 | Dinh et al. |

* cited by examiner

Primary Examiner—Gary L Laxton
(74) Attorney, Agent, or Firm—Blakely, Sokoloff, Taylor & Zafman LLP (57) ABSTRACT

A number of output phases of a switching power supply are controlled, to regulate its output. An under-voltage condition is responded to, by overriding the control of the output phases, forcing some or all of the phases on, depending on a detected magnitude of a change in the power supply load. Other embodiments are also described and claimed.

20 Claims, 7 Drawing Sheets

SWITCHING POWER SUPPLY TRANSIENT SUPPRESSION

An embodiment of the invention is directed to actively suppressing a transient in the output of a switching electrical power supply. Other embodiments are also described.

BACKGROUND

Switching electrical power supplies, also referred to as switched mode power supplies, are capable of efficiently converting an input voltage to an output voltage. One or more active power devices or "phases" are switched, that is, turned on and turned off in rapid succession, to control the average amount of energy that is driven from the input to an energy storage element at the output. This switching is controlled in a manner that results in a controlled voltage waveform at the output. For example, a step down converter, such as a buck converter, converts a typically unregulated input DC voltage into a lower, regulated DC voltage for a rated load current (or simply, load).

A switching power supply may have one or more output phases that are controlled by a main voltage regulation feedback control loop, to regulate its output. An output phase typically includes one or more power switching devices, such as a transistor, and sometimes their drivers. These devices feed current (from the input) to a passive energy storage device such as an inductor and/or capacitor to which the output is coupled. To regulate the output voltage, the power switching devices are rapidly turned on and off, e.g. according to a pulse width modulation, with the appropriate timing and in response to voltage and current feedback from the output.

Although a closed control loop is provided to regulate the output voltage of a switching power supply, a large increase in the load at the output will generally cause the output voltage to drop temporarily. This drop in voltage, also referred to as a droop, under-voltage, or an under-shoot condition, is a transient in that the closed control loop will eventually recover and force the output back up to its regulated, steady state voltage, while simultaneously driving the applied load. In addition, there are situations where the output voltage actually increases temporarily, known as an over-voltage condition, due to, for example, the sudden removal of a large load or through a temporary instability of the main control loop.

Transients at the output of a switching power supply are typically held in check by using greater energy storage devices at the output, and in particular, larger capacitors with low inductance and low equivalent series resistance. These types of capacitors, such as ceramic capacitors, however are both costly and bulky.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
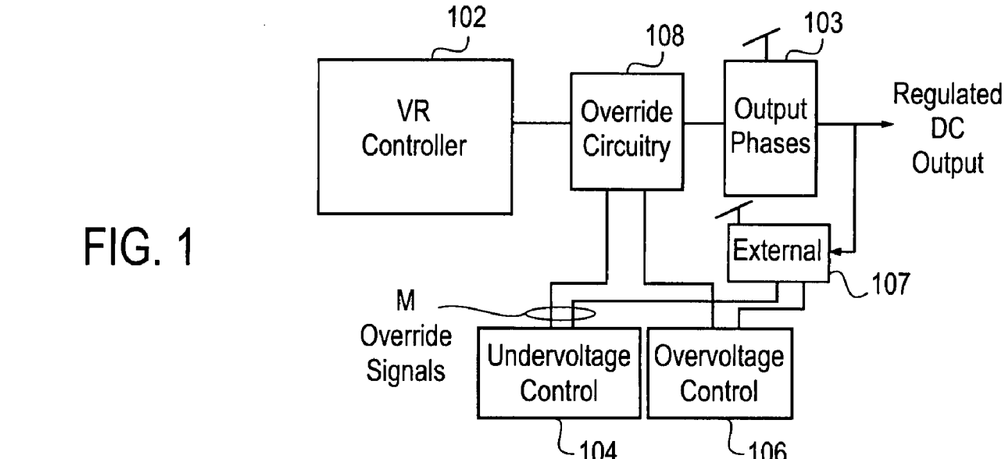
FIG. 1 is a block diagram of a switching power supply having under-voltage and over-voltage control blocks.

FIG. 1 shows a block diagram of a switching power supply. A switch mode voltage regulator controller 102 is coupled as part of a main voltage regulator, closed control loop, to control the switching of one or more output phases 103, to regulate an output DC voltage. Although not shown, the power supply also includes output voltage and/or output current (load) sensing circuitry that feeds back information to the controller 102. An under-voltage control block 104 is provided, to respond to and suppress an under-voltage condition in the regulated output. Note that the output of the power supply may be defined to be one or more different nodes that are driven either directly or indirectly by the output phases 103. An example will be given below with respect to a buck converter in FIG. 6B.

The under-voltage condition may be loosely defined as the output voltage falling below a specified threshold, for a relatively short period of time. The under-voltage condition is an example of a transient. Another type of transient is an over-voltage condition where the output voltage rises above a specified threshold, which may or may not be the same as the one used for defining the under-voltage condition. An over-voltage control block 106 is provided to suppress the over-voltage condition, by, for example, clamping the output temporarily to a relatively low voltage node.

To suppress a transient, override circuitry 108 is provided, located between the controller 102 and the output phases 103. As its name suggests, the override circuitry 108 serves to override a command from the controller 102 that is directed to the output phases 103. The override circuitry 108 allows some or all of the phases 103 to be forced "on", depending on a detected magnitude of a change in the power supply load that is driven by the output. This change in the power supply load may be, for example, due to a processor (whose core supply voltage is driven by the switching power supply) transitioning from a sleep state to a normal or active state. The under-voltage block responds differently, depending on the detected magnitude of the power supply load change. For example, if the load change is small, then up to one-half of the phases are forced on. However, if the load change is large, then more than one-half of the phases are forced on. Thus, rather than respond merely to a drop in the output voltage, the under-voltage control block measures and acts in response to how much the load has increased.

In addition to under-voltage transients, the power supply output may exhibit over-voltage transients, which are dealt with by the over-voltage control block 106. It responds to an over-voltage condition in the regulated output, by turning on a clamp device (not shown, but would be part of the external circuitry 107), to decrease the output voltage. The clamp device could then be turned off, in response to the over-voltage condition having disappeared (i.e., the output voltage having recovered).

Returning to the under-voltage control block 104, there are several different possibilities for responding to an under-voltage condition. For example, the one or more forced phases may be maintained "on", for a period of time that not only depends on the detected magnitude of the change in the power supply load, but also upon the expiration of a period of time. In other words, the forced phases in that case are released only if the predetermined period of time has expired. This period of time may be previously determined or set, that is before the under-voltage condition has arisen. It should be selected based on a number of parameters of the switching power supply, including the nominal output voltage, the expected load current range, and, of course, the detected magnitude of the load change.

In addition to controlling the number of output phases to turn on, as a function of detected magnitude of power supply load change, the under-voltage control block 104 may also be provided with the capability to modulate the period of time that the forced phases are kept on, again as a function of the detected load change. For example, the forced phases (whatever they may be) are maintained on for a short period of time, if the load change is small. However, if the load change is large, then the same forced phases would be maintained on for a longer period of time.

The above-described under-voltage control techniques may be able to respond faster (to suppress the transient) than a mere delta voltage measurement. The more effective transient suppression may be useful for powering devices that are less tolerant of under-shoot, such as advanced microelectronic data processors that are operating at relatively low supply voltages of about one volt or less, and at a relatively high load current of 100 amps and above. The power supply load in these cases is the core voltage supply current demand by one or both processor cores. While driving a processor, the load may change from, for example, 0% to 20% or it may change from 20% to 100%, depending on the processor activity level (e.g., deep sleep; sleep; active; and stop clock throttled). Changes between these activity levels may cause different amounts of under-shoot and/or over-shoot. The embodiments of the invention are designed to distinguish between at least two different types of load change, based on a detected or measured magnitude of each load change, and then override the output phases accordingly to compensate for the transient.

Examples of processor devices include multi-core, chip processors, where in that case the processor includes a chip or die that has multiple processor cores operating simultaneously. These devices may be used in desktop, notebook, and sever computers. The embodiments of the invention described here are also useful to provide the supply voltage of devices other than such processors, such as embedded processors used in handheld phone units and rotating disk drive units.

Figure 2:
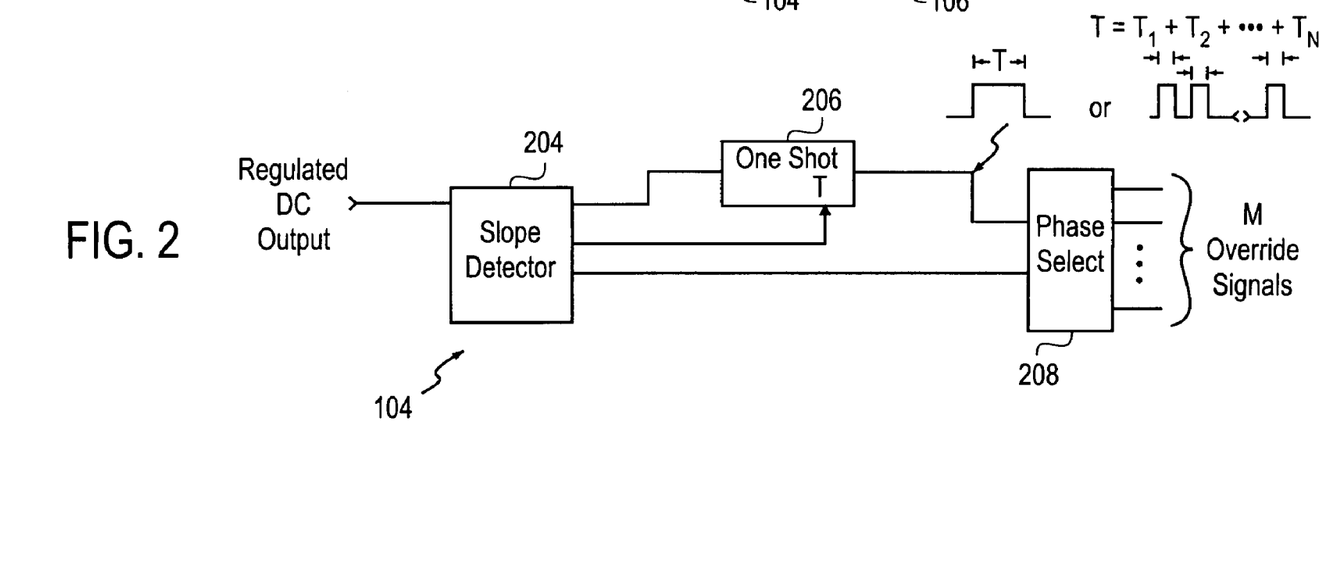
FIG. 2 is a block diagram of the under-voltage control block, according to an embodiment of the invention.

Turning now to FIG. 2, a more detailed block diagram of an example under-voltage control block 104 is shown. A slope detector 204 has an input that receives the regulated DC output voltage of a power converter having multiple output phases. An output of the slope detector 204 is coupled to phase select circuitry 208 that provides one or more (up to M) override signals. The override signals indicate which of the output phases 103 are to be forced on, under control of the slope detector 204. The signals will indicate that more of the output phases are to be forced on, if a detected voltage slope is larger, and, inversely, fewer are to be turned on if the slope is smaller.

In this embodiment, the under-voltage control block 104 also has a one-shot 206 whose pulse width control input labeled T is coupled to another output of the slope detector 204. Its trigger input is also coupled to another output of the slope detector 204. The output of the one-shot provides a pulse having a width T, or alternatively a sequence of shorter pulses $T_1, T_2, \ldots T_M$ whose total pulse width is equal to T. The pulse is fed to the phase select circuitry 208 to control the duration of the phases being forced on. The slope detector 204 thus not only triggers the one-shot, but also determines its pulse width, as well as contributes to the phase selection. An example of how this may be accomplished is shown in FIG. 3.

Figure 3:
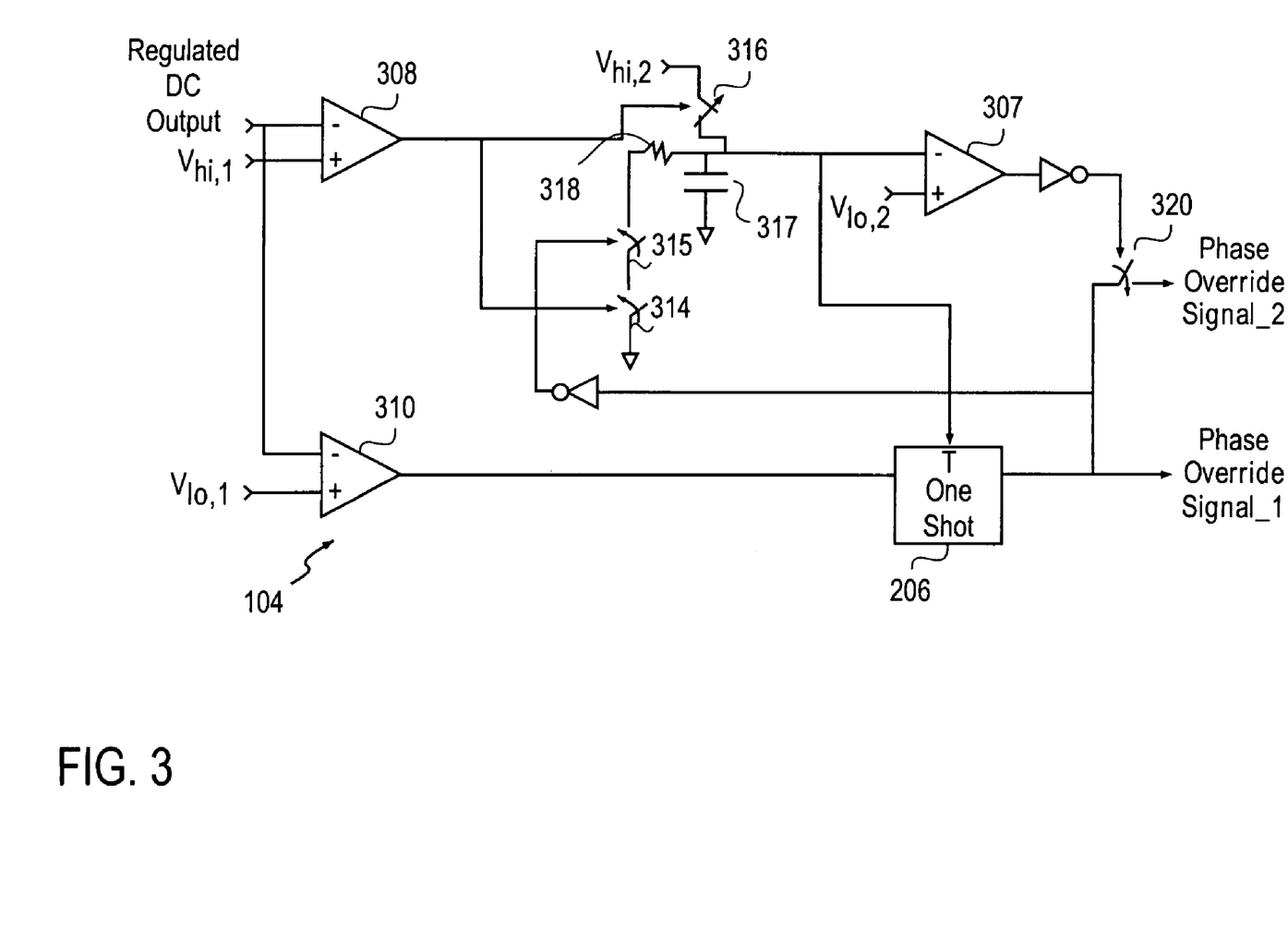
FIG. 3 is a simplified circuit schematic of example under-voltage control circuitry.

FIG. 3 shows a simplified circuit schematic of an example under-voltage control block featuring the basic components shown in FIG. 2. The slope detector 204 may be viewed as the combination of opamps 308, 310, switches 314-316, and capacitor 317, which also form a timer or delay circuit. The phase select circuitry 208 in this embodiment (where there are only two override signals), includes opamp 307 and switch 320. Beginning with the opamps 308, 310, each of these has an input that is set to a threshold voltage that is below a nominal converter output voltage. The other input of each opamp is coupled to the regulated DC output. These opamps 308, 310 thus act as a window detector, detecting when the regulated converter DC output voltage falls into a window and, after continuing its drop, leaves the window. After leaving the window, that is falling below the threshold $V_{LO,1}$, the opamp 310 triggers the one-shot 206 which provides a pulse having a width T. The width of this pulse is controlled by the rest of the slope detector circuitry including the combination of switches 314-316 and the current voltage present on the capacitor 317. The latter forms a delay circuit which is triggered by the opamp 308. The switch 316, when closed, charges the capacitor 317 relatively quickly to a preset high threshold $V_{HI,2}$. The capacitor 317 is allowed to discharge only if both switches 314 and 315 are closed. This happens only if the regulated DC output is below the high threshold $V_{HI,1}$, and the one-shot 206 has not triggered.

It should be noted that in this example, an output of the one-shot 206 is treated as a phase override signal_1 that, when asserted, indicates that one or more output phases of the converter be forced on. This same signal may also be used to derive phase override signal_2, via switch 320. Also, the override signals in this example are generated in open loop fashion, namely, that their assertion intervals or pulse widths are fixed regardless of the behavior of the converter output voltage. In other words, in this embodiment, the override signal is deasserted only upon expiration of the preset time interval.

Figure 4:
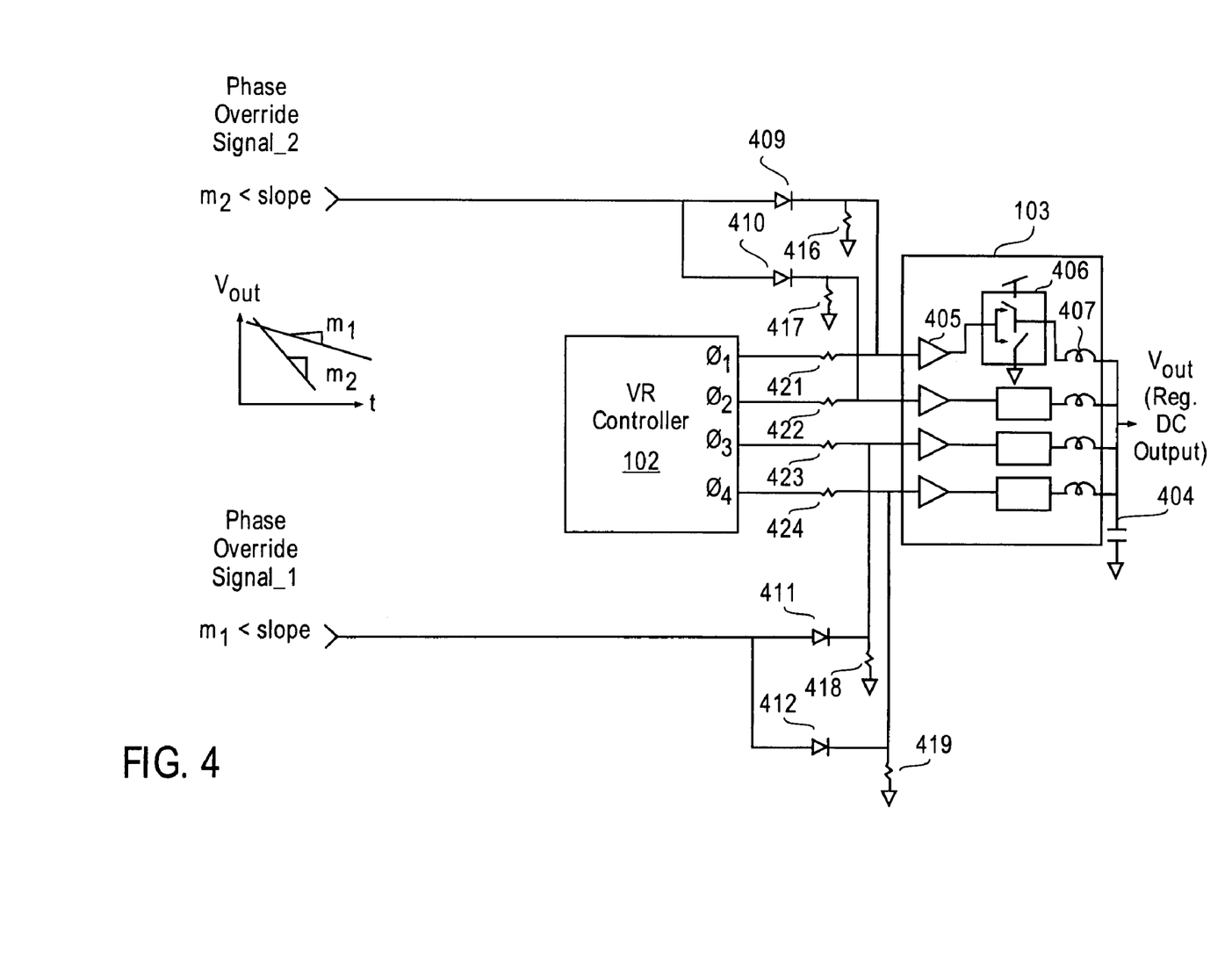
FIG. 4 is a simplified circuit schematic of example override circuitry.

Before explaining the operation of FIG. 3, an example of how the phase override signals may be coupled to the override circuitry 108 is shown in FIG. 4. Recall that in this example, there are only two phase override signals, and four output phases, where each phase may be viewed as including a driver 405, a power switching device 406, and an energy storage inductor 407. Coupled between the controller 102 and the output phases 103 is the override circuitry 108, composed of, in this example, diodes 409-412, pull-down resistors 416-419, and isolation resistors 421-424. In this case, the phase override signal _1 when asserted, indicates that the slope of the output voltage is greater than a predetermined $m_1$ (lower slope). As to phase override signal_2, this signal when asserted indicates that the detected slope is greater than $m_2$ (a larger slope, which is greater than $m_1$). A graphic representation of $m_1$ and $m_2$ is also shown in FIG. 4. Thus, when the slope is greater than $m_1$ but less than $m_2$, signal_1 is asserted and signal_2 is deasserted. This results in phases 3 and 4 being overridden. If the detected slope is greater than $m_2$, then in addition to phases 3 and 4, phase 1 and 2 are also forced on. In general, the same basic technique may be applied to power converters having two or more output phases.

Figure 5:
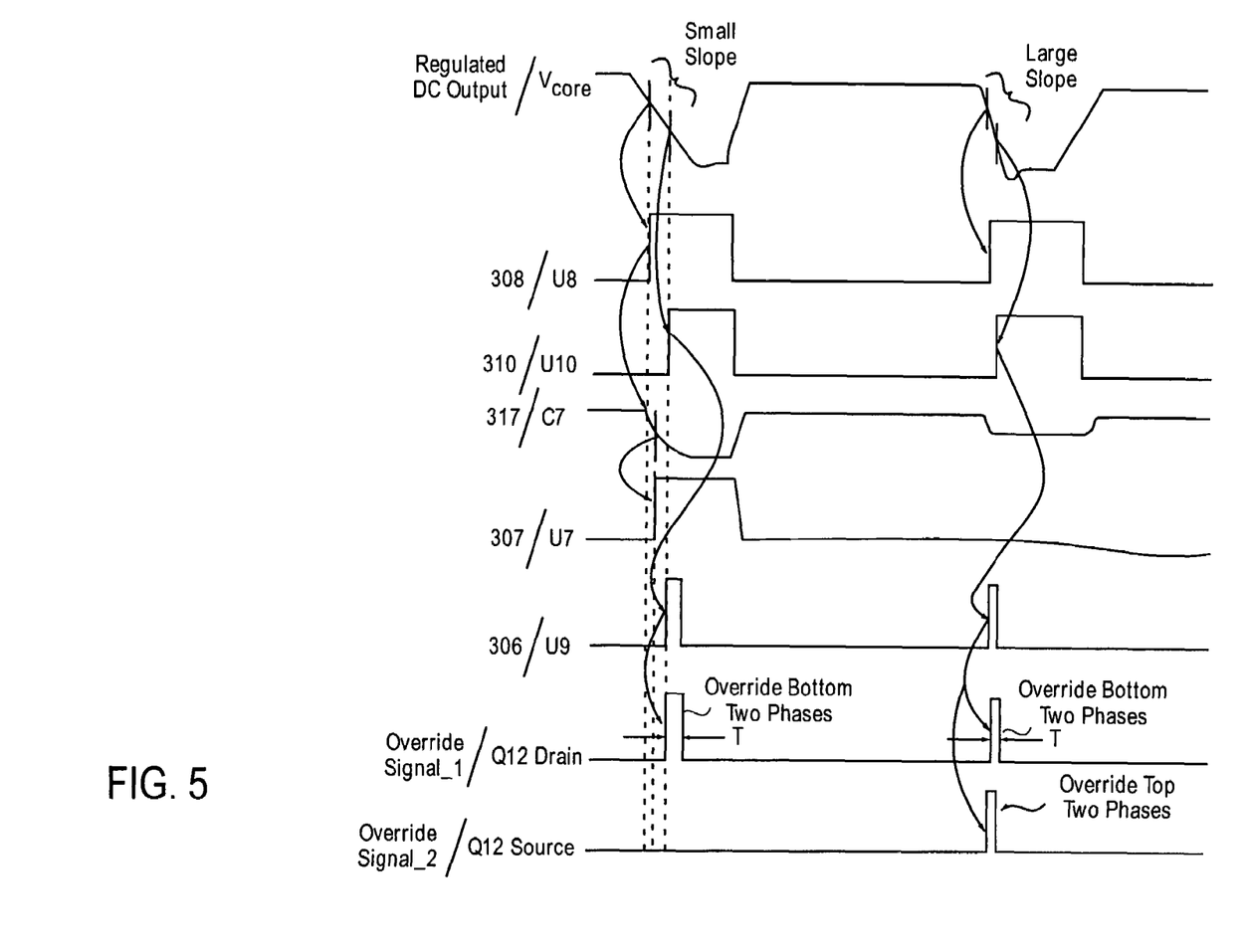
FIG. 5 is a timing diagram of the response of example under-voltage control circuitry to an example under-voltage condition.

Returning now to the circuit schematic of FIG. 3, operation of this circuit may be illustrated using the example timing diagram of FIG. 5. There are eight waveforms shown in FIG. 5, beginning with the regulated DC voltage exhibiting two instances of under-shoot, one with a small slope and another with a large slope. The effect of this voltage waveform on several different parts of the under-voltage circuitry are shown, in terms of the outputs of opamps 308, 310, and 307. The voltage of capacitor 317 and the output of the one-shot 206 are also shown. Finally, the override signals 1 and 2 are also shown. Note that these waveforms also correspond to the voltages at locations indicated by $V_{CORE}$, U8, U10, C7, U7, U9, Q12 drain, and Q12 source that are in the more detailed circuit schematic shown in FIG. 6, which is a further example of under-voltage control circuitry as applied to a particular type of buck converter.

Returning to FIG. 5, with the regulated DC voltage at its steady level, all outputs are deasserted and the capacitor 317 is charged to its initial level $V_{HI,2}$, due to switch 316 being closed. As the output voltage, however, drops below $V_{HI,1}$, opamp 308 changes state which causes switch 316 to open and switch 314 to close. Since switch 315 is closed at this time (because the one-shot 206 has not triggered), the capacitor 317 beings its discharge according to a rate that has been predetermined by selection of its capacitance and the resistive element 318.

As the output voltage continues its drop below $V_{LO,1}$, the opamp 310 changes state, thereby triggering the one-shot 206 and asserting the override signal_1. It should be noted, however, that in this case, since the drop in the output voltage was "slow" relative to the predetermined discharge rate of capacitor 317, opamp 307 changed state prior to the override signal_1 being asserted. With the opamp 307 in its asserted state, the override signal_2 is inhibited, because switch 320 is opened. In other words, the detected slope of the output voltage is deemed to be small in this case, such that only the bottom two phases 3 and 4 of the power converter are overridden (see FIG. 4).

As to the pulse width T of the override signal, this is determined by the relationship between the point in time at which one-shot 206 is triggered and the point at which the opamp 308 is triggered. In other words, the pulse width is determined as a function of the time interval or the delay between the output voltage falling just below the high threshold $V_{HI,1}$ and the output voltage falling just below the low threshold $V_{LO,1}$, namely a measure of the slope of the output voltage. For a smaller slope, the pulse width T, as controlled by the voltage across the capacitor 317, is smaller. For larger slope, the one-shot 206 is triggered sooner, and therefore the larger voltage on the capacitor will lengthen the pulse width.

FIG. 5 also shows another under-voltage condition, this time with a large slope, namely one that is large enough to cause a greater number of the output phases to be forced on. Starting with the regulated output voltage at its steady state level, its decrease below $V_{HI,1}$ causes opamp 308 to change states, while its continued decrease below $V_{LO,1}$ causes opamp 310 to change states. However, in this case, due to the steeper drop in output voltage, the opamp 310 changes state prior to the opamp 307 changing state (the latter can happen only if capacitor 317 is discharged to below $V_{LO,2}$). This early assertion of opamp 310, relative to the decay rate of capacitor 317, causes switch 315 to open thereby preventing capacitor 317 from discharging all the way down to $V_{LO,2}$. This means that opamp 307 does not change state (and switch 320 remains closed), so that the triggering of one-shot 206 asserts not only override signal_1, but also override signal_2.

Note that the pulse width T may be controlled in the same manner as when the output voltage exhibited a small slope, namely as a function of the voltage on capacitor 317 at the time of the triggering of the one-shot 206. Once again, if the one-shot 206 were triggered earlier, then the voltage on the capacitor 317 would be higher, so that the pulse width T would be larger.

Figure 6A:
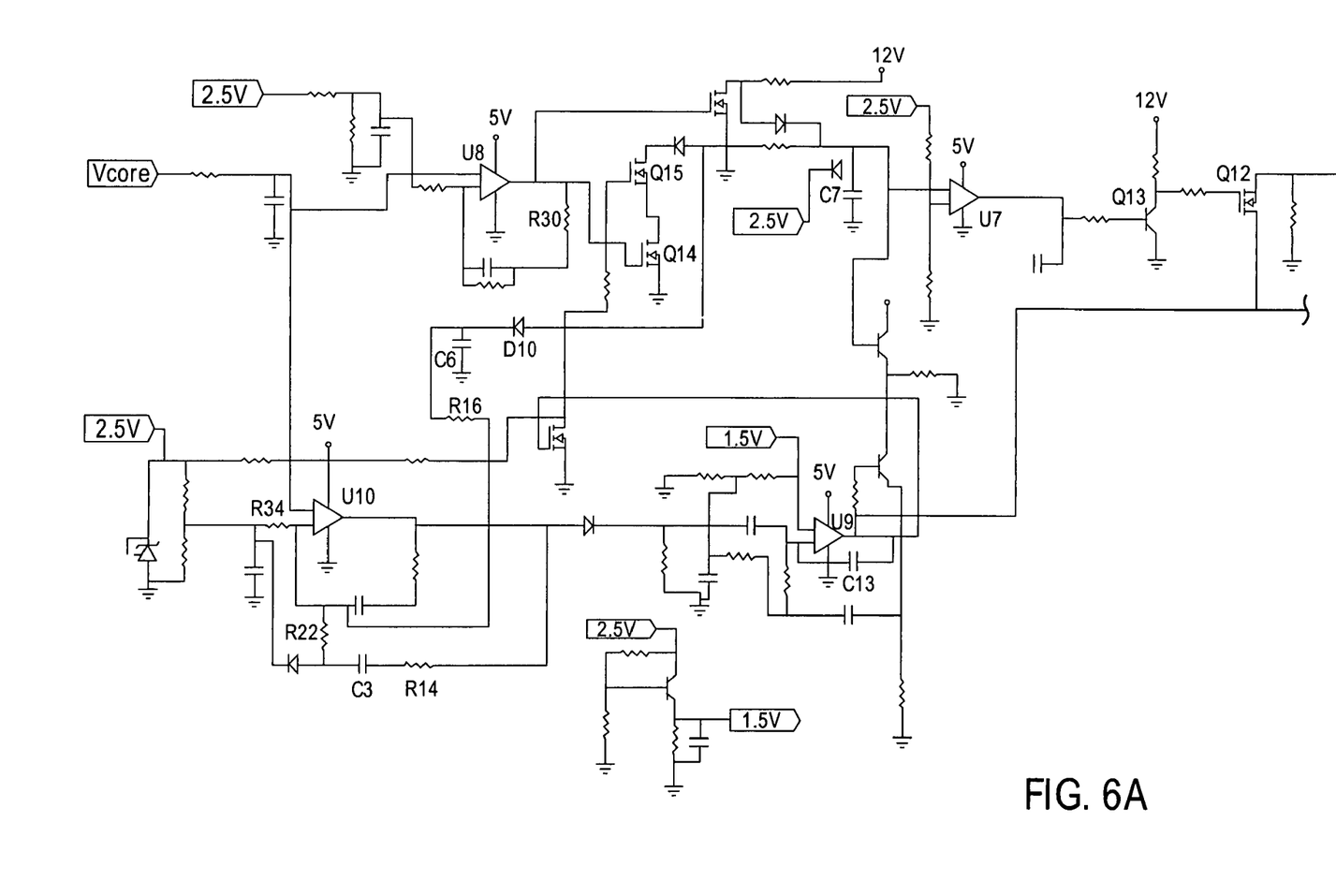
FIGS. 6A-6B are a detailed circuit schematic of example under-voltage control circuitry used with a buck converter.
Figure 6B:
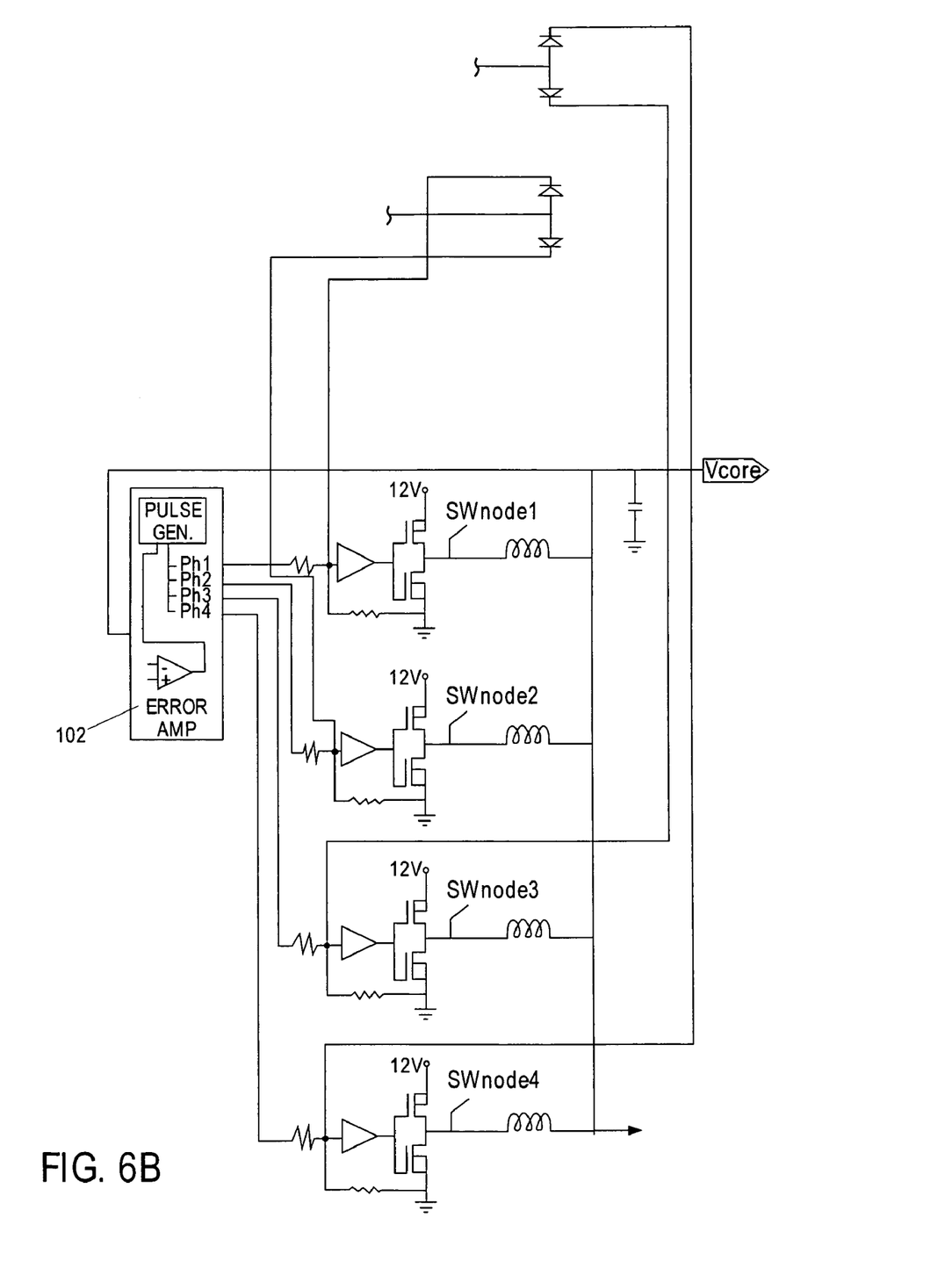

The above-described timing diagram also applies to the components shown in the circuit schematic of FIGS. 6A-6B, namely a processor voltage $V_{CORE}$, opamps U8, U10, U7, and U9, and capacitor C7. The override signals appear in this example on the drain and source sides of the single transistor Q12. The schematic of FIGS. 6A-6B is merely an example of how the under-voltage circuitry may be designed for a system in which there are the following supply voltages available: 2.5 volts DC, 5 volts DC, and 12 volts DC. The power converter in this case converts between the 12 volt DC rail and a regulated $V_{CORE}$ of about 1.3 volts. There are four output phases as can be seen, to provide a nominal output current of about 100 amps. The one-shot 206, in this example, is implemented around opamp U9. Note how the pulse width is controlled, in this example, through the operation of transistors Q9 and Q16, which transfer the voltage across capacitor C7 to C13, to set the duration or duty cycle of the pulse.

As to the slope detection aspect of FIG. 6A, consider that when U8 changes state to a high level, Q14 is turned on. This removes the positive voltage on a node of D10 (assuming Q15 is also turned on). This causes capacitor C6 to decay, through R16 and R34 which join the non-inverting input of U10. A relatively small current is thus passed through R34. Now, the longer it takes for U10 to change state (to a high level), the smaller the current becomes through R34. Thus, the voltage drop across R34 will progressively decrease as the state change of U10 is delayed. This actually provides an earlier turn on for U10, if the slope of $V_{CORE}$ is moving rapidly, indicating a sudden heavy load. The circuit will thus respond even faster to sudden load changes. The output of U10 also drives R14, C3, and R22, to put a temporary bias on the non-inverting input of U10 to prevent trigger signals to the one-shot that are too close together.

The rest of the circuitry shown in FIGS. 6A-6B is self-explanatory to those of ordinary skill in the art, particularly in view of their analogy to the basic components described in FIGS. 3 and 4 above. Of course, the example circuit schematic of FIGS. 6A-6B is merely one of several different ways of implementing the basic components of FIGS. 3 and 4, and accordingly should not in anyway be construed as limiting the scope of any embodiment of the invention.

Figure 7:
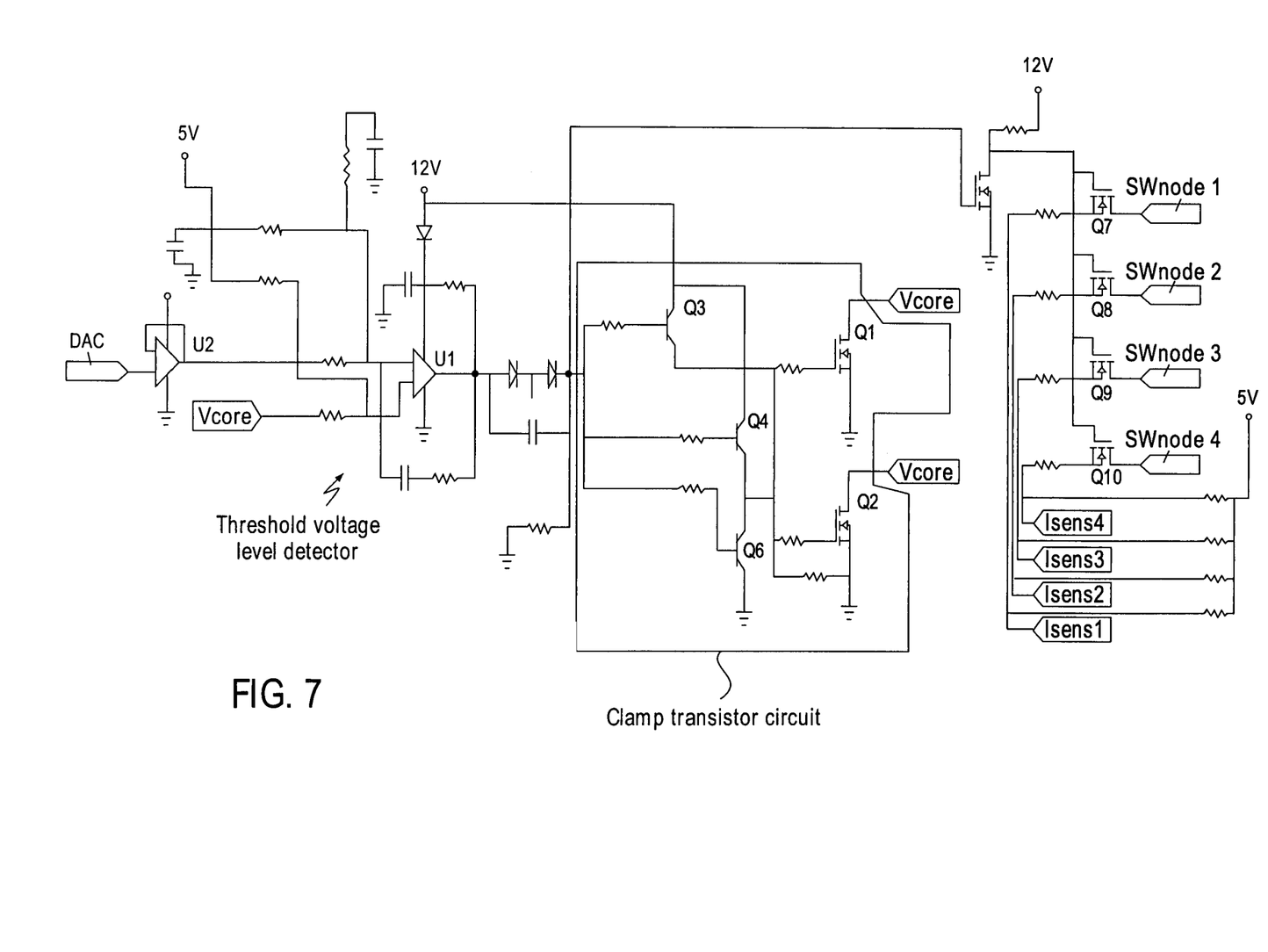
FIG. 7 is a circuit schematic of example over-voltage control circuitry.

Although the focus has been on the under-voltage circuitry until now, another embodiment of the invention lies in an over-voltage control block 106 (see FIG. 1) that also provides a seamless transition between the main voltage regulation control loop and the active transient suppression loop (which may include both the over-voltage and under-voltage control blocks). FIG. 7 illustrates a detailed circuit schematic of an example over-voltage control block that is designed to operate with a power converter having four output phases. Opamp U1 serves as part of a threshold voltage detector, to detect when an over-voltage condition has occurred, namely when the regulated output voltage (here, $V_{CORE}$) rises above a programmable threshold (set by, in this example, a digital to analog converter, DAC, output). This causes opamp U1 to change states, and turn on the clamp transistor circuit that is composed of transistors Q1-Q6. The clamp causes the output node at $V_{CORE}$ to be pulled down to a low voltage level, in this case ground. At the same time, switches Q7-Q10 are opened thereby isolating the switch nodes 1-4 (see FIG. 6B, where the switch nodes are the output nodes of the power switching devices for each phase) from sense resistors used by the voltage regulator controller 102. The sense resistors are part of a feedback path of the main voltage regulator closed control loop. Accordingly, this inherently causes the controller 102 to inhibit its phase control outputs, during the time that the over-voltage clamp has been asserted. This action, of course, prevents shorting out the input rail to the switching power supply, during a clamp operation. This, however, occurs without adding additional input control ports to the controller 102, thereby allowing the active transient suppression circuit here to be used with a conventional controller.

The invention is not limited to the specific embodiments described above. For example, some of the circuit schematics described above are directed to a four phase, buck converter, with two under-voltage states defined. Where the detected output voltage slope is small, just two out of the four phases are turned on to compensate for the under-voltage condition. Where the detected voltage slope is large, all four phases are turned on, essentially simultaneously. An alternative, however, is to define more than two states, so as to provide finer granularity control over transient suppression (e.g., defining four under-voltage states by successively increasing output voltage slopes, corresponding to one, two, three, and all four phases being turned on in each case.) The techniques may also be used with power converters that have fewer than or greater than four output phases. As another example, the window-type voltage slope detection may alternatively be performed using an opamp differentiator. Accordingly, other embodiments are within the scope of the claims.

What is claimed is:

1. A method for operating a switching power supply, comprising:
   controlling a plurality of output phases of a switching power supply to regulate its output; and
   responding to an under-voltage condition in the regulated output by overriding the control of the output phases, forcing some or all of the phases on, depending on a detected magnitude of a change in power supply load of the switching power supply, maintaining the forced phases on for a short, predetermined period of time if the magnitude of the load change is small and for a long, predetermined period of time if the magnitude of the load change is large.

2. The method of claim 1 wherein the output phases number at least four, and wherein responding to the under-voltage condition comprises:
   turning on up to one half of the phases if the magnitude of the load change is small, and turning on more than one half of the phases if the magnitude of the load change is large.

3. The method of claim 1 wherein responding to the under-voltage condition comprises releasing the forced phases only upon expiration of the period of time.

4. The method of claim 1 wherein responding to the under-voltage condition further comprises:
   turning on an external component depending on the magnitude of the load change, to increase the output voltage.

5. The method of claim 1 wherein responding to the under-voltage condition further comprises:
   inhibiting the turn on of an over-voltage condition clamp device.

6. The method of claim 1 further comprising:
   responding to an over-voltage condition in the regulated output by turning on a clamp device to decrease the output voltage.

7. The method of claim 6 wherein responding to the over-voltage condition further comprises turning off the clamp device in response to the over-voltage condition having disappeared.

8. A method for operating a power supply, comprising:
   switching a plurality of output phases of a power supply in accordance with a main voltage regulation control loop; and
   overriding the main voltage regulation control loop in accordance with a transient suppression control loop which turns on a fewer number of the phases to suppress a transient if the transient exhibits a small power supply output voltage slope, and a greater number of the phases if the transient exhibits a large slope.

9. The method of claim 8 wherein the main control loop is a closed feedback control loop, and the transient suppression control is open loop.

10. The method of claim 8 wherein overriding the main voltage regulation control loop in accordance with the transient suppression control loop keeps the phases on for a short period of time if the power supply output voltage slope during the transient is small, and a long period of time if the slope is large.

11. The method of claim 8 wherein overriding the main voltage regulation control loop in accordance with the transient suppression control loop keeps the phases on for a period of time that is proportional to the power supply output voltage slope during the transient.

12. The method of claim 10 wherein the transient suppression control loop keeps the phases on for a selected period of time by applying a plurality of pulses whose total on-time is the selected period of time.

13. The method of claim 8 further comprising:
   overriding the main voltage regulation control loop in accordance with the transient suppression control loop which turns on a clamp device to decrease the output voltage, and turns off the clamp device and releases the main voltage regulation control loop only after the output voltage has recovered.

14. A switching power supply comprising:
   a converter having a plurality of output phases; and
   an output transient suppression circuit coupled to the converter and having a voltage slope detector and converter phase select circuitry,
   the slope detector having an input coupled to an output of the converter and an output coupled to an input of the converter phase select circuitry, wherein the phase select circuitry is to provide a plurality of override signals that indicate which of the output phases are to be forced on under control of the slope detector, wherein the signals are to indicate that more of the output phases be forced on if a detected voltage slope is larger.

15. The switching power supply of claim 14 wherein the output transient suppression circuit further comprises a one-shot having a pulse width control input coupled to an output of the slope detector, a trigger input coupled to another output of the slope detector, and an output coupled to the phase select circuitry to control the duration of the phases being forced on.

16. The switching power supply of claim 15 wherein the slope detector comprises a first opamp whose input is set to a high threshold below a nominal converter output voltage, and a second opamp whose input is set to a low threshold below the nominal converter output voltage, and wherein the output of the converter is coupled to further, respective inputs of the first and second opamps, and wherein an output of the second opamp and not the first opamp triggers the one-shot.

17. The switching power supply of claim 16 wherein the slope detector further comprises a delay circuit that is triggered by the first opamp and that is to assert one of the override signals if the one-shot is triggered late and deassert said one of the override signals if the one-shot is triggered early.

18. A system comprising:
   a switching power supply having a plurality of output phases, phase override circuitry, and transient suppression circuitry that is to measure a negative slope of an output voltage of the power supply, and assert a first pulse signal, whose pulse width is predetermined, to the phase override circuitry if the measured slope is low and a second pulse signal, whose pulse width is predetermined, to the phase override circuitry if the measured slope is high, and wherein a total pulse width of each of the first and second signals is a function of the measured slope; and
   a multi-core chip processor having a core voltage input coupled to an output of the power supply.

19. The system of claim 18 further comprising an external damp circuit coupled to clamp the power supply output to a low voltage, and wherein the transient suppression circuitry is to assert a clamp signal to the external clamp circuit if the output voltage exhibits over-shoot.

20. The system of claim 19 wherein the transient suppression circuit is to measure the negative slope using a window detector, and is to assert the first and second signals only if the output voltage falls below a lower threshold of the window detector.

\* \* \* \* \*

UNITED STATES PATENT AND TRADEMARK OFFICE
CERTIFICATE OF CORRECTION

PATENT NO. : 7,327,128 B2
APPLICATION NO. : 11/027464
DATED : February 5, 2008
INVENTOR(S) : Dinh It is certified that error appears in the above-identified patent and that said Letters Patent is hereby corrected as shown below:

In column 10, at line 13, delete "damp" and insert --clamp--.

Signed and Sealed this

Second Day of September, 2008

JON W. DUDAS
*Director of the United States Patent and Trademark Office*